US009398094B2

(12) United States Patent
Uchida et al.

(10) Patent No.: US 9,398,094 B2
(45) Date of Patent: Jul. 19, 2016

(54) DATA TRANSFER DEVICE

(71) Applicant: NEC Corporation, Minato-ku, Tokyo (JP)

(72) Inventors: Risako Uchida, Tokyo (JP); Shinji Abe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 330 days.

(21) Appl. No.: 14/039,672

(22) Filed: Sep. 27, 2013

(65) Prior Publication Data

US 2014/0089447 A1 Mar. 27, 2014

(30) Foreign Application Priority Data

Sep. 27, 2012 (JP) .................................. 2012-213856

(51) Int. Cl.
*H04L 29/08* (2006.01)
(52) U.S. Cl.
CPC .................................. *H04L 67/1097* (2013.01)
(58) Field of Classification Search
USPC .......................................................... 709/212
See application file for complete search history.

(56) References Cited

U.S. PATENT DOCUMENTS

| 6,622,263 | B1 * | 9/2003 | Stiffler | G06F 11/1469 711/135 |
| 2007/0179995 | A1 * | 8/2007 | Prahlad | G06F 17/30321 |
| 2011/0029709 | A1 * | 2/2011 | Feiereisel | G06F 13/385 710/305 |
| 2014/0019572 | A1 * | 1/2014 | Cardona | G06F 15/167 709/212 |

FOREIGN PATENT DOCUMENTS

JP       H4-349524 A       12/1992

OTHER PUBLICATIONS

Japanese Office Action for JP Application No. 2012-213856 mailed on Mar. 4, 2014 with English Translation.
Brendan Cully et al. "Remus: High Availability via Asynchronous Virtual Machine Replication", [online], [searched on Sep. 5, 2012], Internet <URL: http://www.cs.ubc.ca/ andy/papers/remus-nsdi-final.pdf>. Cited in the Specification.

* cited by examiner

*Primary Examiner* — Kristie Shingles
*Assistant Examiner* — Mohammad Yousuf A Mian

(57) ABSTRACT

When a checkpoint comes, the control section selects some of a plurality of small areas which are transfer targets in the memory as small areas to be transferred to the outside of the own computer through the save area (indirect transfer small areas), and selects the others as small areas to be transferred to the outside of the own computer not through the save area (direct transfer small areas). Within a period in which updating from the own computer to the memory is suspended, the control section copies stored data in the small areas selected as the indirect transfer small areas from the memory to the save area with use of the copy section, and in parallel to the copying, transfers stored data in the small areas selected as the direct transfer small areas from the memory to the outside of the own computer with use of the communication section.

17 Claims, 11 Drawing Sheets

DATA TRANSFER DEVICE

INCORPORATION BY REFERENCE

The present application is based upon and claims the benefit of priority from Japanese patent application No. 2012-213856, filed on Sep. 27, 2012, the disclosure of which is incorporated herein in its entirety by reference.

TECHNICAL FIELD

The present invention relates to a data transfer device, a data transfer method, and a program, for transferring data stored in a memory of a computer to another computer.

BACKGROUND ART

As computer systems having high availability, HA clusters (High Availability clusters) and FT servers (Fault Tolerant servers) of a hot standby structure have been known.

An HA cluster is intended to make a system redundant by connecting a plurality of servers with one another. If a failure occurs in the currently used (active) server, processing is taken over by another server prepared as a standby system, so it seems that the cluster operates normally as a whole. Main methods thereof include an active-standby method and a replication method.

In an HA cluster of an active-standby method, the active system and the standby system share a storage. The active system writes application-dependent information necessary for synchronizing the standby system in the shared storage, and the standby system performs recovery processing with use of such information at the time of failover. As such, it is impossible to achieve availability transparently, when viewed from the applications and the OS. Further, it takes time for failover, and the services cannot be provided during that time.

In an HA cluster of a replication method, each of the active system and the standby system has a storage, independently. A request which reaches the application of the working system is transferred to the standby system, causing the standby system to have state transition which is the same as the active system. In general, making the states of a plurality of systems conform with each other is called synchronization. When a failure occurs in the working system and the working system stops, as the application state of the standby system is synchronized with the active system, it is possible to separate the active system and switch the processing to the standby system to thereby continue the service. However, as the replication mechanism must be added to each of the applications to be clustered, it is impossible to achieve the availability transparently when viewed from the applications and the OS.

As described above, in an HA cluster, it is necessary to add availability-conscious mechanism to the applications and the OS. On the other hand, in the case of an FT server, it is possible to continue services transparently without the need for particular processing by the applications and the OS. The approaches to realize an FT server include a hardware approach and a software approach.

In an FT server of a hardware approach, main hardware components such as a CPU, a memory, and a storage are made redundant, and if a failure occurs in any of the components, such a component is separated so as to continue operation. Under a definition that a module including a CPU, a memory, and a chip set is a CPU subsystem, and that a module including various IO devices is an IO subsystem, in a typical FT server in which components are duplexed, the methods for duplexing the CPU subsystem and for duplexing the IO subsystem are different. In the CPU subsystems, the operations of the hardware are caused to conform with each other completely in clock units. This is called lock-step. As the duplex CPU subsystems perform completely the same operations, when a failure occurs, the CPU subsystem in which the failure has occurred is separated logically, and the operation is instantly switched to the normal CPU subsystem to continue operation. In the IO subsystems, although they do not operate in lock-step, when a failure occurs, the operation is immediately switched to the other IO subsystem. An FT server of a hardware approach is able to realize an extremely high availability. However, as it is configured of special hardware, it takes a higher introduction cost compared with general servers of similar performance.

On the other hand, an FT server of a software approach uses a virtual technique which enables one or a plurality of OSs to operate on a physical computer. A computer virtually constructed on a physical computer is called a virtual computer or a virtual machine. In an FT server of a software approach, physical computers are made redundant, and a virtual computer of an active system and a virtual computer of a standby system are arranged on different physical computers, respectively. When a failure such as a hardware error occurs on the physical computer to which the virtual computer of the active system belongs, the processing performed by the virtual computer is continuously performed by the virtual computer of the standby system on the other physical computer. In order to continue the service transparently when viewed from the application and the OS, the FT server of the software approach performs processing to conform the states of the virtual computers of the active system and the standby system with each other, namely, synchronization.

Methods for synchronizing the virtual computers of the active system and the standby system mainly include two methods, namely a virtual lock-step method and a checkpoint method. In a virtual lock-step method, an input to the virtual computer of the active system is also given to the virtual computer of the standby system so as to make the state of the virtual computer of the standby system transit in the same manner as that of the virtual computer of the active system. This method has an advantage that the quantity of data required for synchronization between the virtual computers is small. However, if the types of the CPUs of the active system and the standby system are different, there is a problem that the systems do not operate.

On the other hand, in a checkpoint method, images of the virtual computer of the active system (CPU, memory, storage, etc.) are periodically transmitted to the standby system so as to make the state of the virtual computer of the standby system conform with the state of the virtual computer of the active system. In the checkpoint method, implementation is relatively easy compared with the virtual lock-step method, and as it does not depend on a particular function of the CPU, there is an advantage that this method can be implemented in a variety of products. However, as images of the virtual computer have a large quantity of data, there is a problem that overhead for one time of synchronization is larger than that of the virtual lock-step method.

In order to solve this problem, a technique of transmitting only images of the virtual computer of the active system, which are updated after the previous checkpoint, has been proposed as first related art of the present invention (see Non-Patent Document 1 shown below, for example). In the first related art, when a checkpoint comes, the virtual computer of the active system is suspended so as to interrupt update to the main memory, and a local copy of all of the dirty pages, which are pages in the main memory having been updated after the previous checkpoint, is created in the buffer provided in the main memory. When a local copy has been created, the suspended virtual computer of the active system is restarted, and along with it, the copied dirty pages are transferred from the buffer to the standby system.

Non-Patent Document 1: Brendan Cully, and 5 others, "Remus: High Availability via Asynchronous Virtual Machine Replication", [online], [searched on Sep. 5, 2012], Internet <URL: http://www.cs.ubc.ca/andy/papers/remus-nsdi-final.pdf>

However, creating local copies of all of the pages to be transferred in the memory requires a reasonable processing time. In the above-described first related art of the present invention, updating of the memory must be suspended until the entire data to be transferred has been copied completely. As such, the performance of the computer deteriorates.

SUMMARY

An exemplary object of the present invention is to provide a data transfer device which solves the above-described problem, that is, a problem that when the content of a memory at a point of time is transferred to the outside of the computer, it is necessary to suspend updating of the memory until the entire data to be transferred has been copied completely.

A data transfer device, according to a first aspect of the present invention, is a data transfer device provided to a computer. The device includes
 a copy unit that creates a copy of data;
 a save area used for temporarily saving data;
 a communication unit that transmits data to the outside of the own computer; and
 a control unit that controls transfer of stored data in a memory including a plurality of small areas to the outside of the own computer.

The control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area,
 within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and
 the control unit transfers the stored data in the small areas, having been copied to the save area, from the save area to the outside of the own computer with use of the communication unit.

A data transfer method, according to a second aspect of the present invention, is a data transfer method for transferring stored data, in a memory including a plurality of small areas, to the outside of a computer. The method includes
 selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area,
 within a period in which updating from the own computer to the memory is suspended, copying stored data in the small areas selected as the indirect transfer small areas from the memory to the save area, and in parallel to the copying, transferring stored data in the small areas selected as the direct transfer small areas from the memory to the outside of the own computer, and
 transferring the stored data in the small areas, having been copied to the save area, from the save area to the outside of the own computer.

A computer, according to a third aspect of the present invention, includes
 a memory including a plurality of small areas;
 a copy unit that creates a copy of data;
 a save area used for temporarily saving data;
 a communication unit that transmits data to the outside of the own computer; and
 a control unit that controls transfer of stored data in the memory to the outside of the own computer.

The control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area,
 within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and
 the control unit transfers the stored data in the small areas, having been copied to the save area, from the save area to the outside of the own computer with use of the communication unit.

A fault tolerant server, according to a fourth aspect of the present invention, includes
 a main server, and
 a standby server communicable with the main server.
 The main server includes
 a memory including a plurality of small areas;
 a copy unit that creates a copy of data;
 a save area used for temporarily saving data;
 a communication unit that transmits data to the backup server; and
 a control unit that controls transfer of stored data in the memory to the backup server.

The control unit selects some of a plurality of the small areas which are transfer targets in the memory as indirect transfer small areas to be transferred to the backup server through the save area, and selects the others of the plurality of the small areas as direct transfer small areas to be transferred to the backup server not through the save area,
 within a period in which updating from an own server to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the backup server with use of the communication unit, and
 the control unit transfers the stored data in the small areas, having been copied to the save area, from the save area to the backup server with use of the communication unit.

A non-transitory computer readable medium, according to a fifth aspect of the present invention, stores a program comprising instructions for causing a computer to function as a copy unit that creates a copy of data;

a save area for temporarily saving data;

a communication unit that transmits data to the outside of the own computer; and a control unit that controls transfer of stored data in the memory to the outside of the own computer, the control unit selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area, within a period in which updating from the own computer to the memory is suspended, copying stored data in the small areas selected as the indirect transfer small areas from the memory to the save area with use of the copy unit, and in parallel to the copying, transferring stored data in the small areas selected as the direct transfer small areas from the memory to the outside of the own computer with use of the communication unit, and transferring the stored data in the small areas, having been copied to the save area, from the save area to the outside of the own computer with use of the communication unit.

With the above-described configuration, the present invention is able to reduce a memory update suspended period when the content of a memory at a point of time is transferred to the outside of the computer, whereby the performance of the computer can be improved.

EXEMPLARY EMBODIMENTS

Next, exemplary embodiments of the present invention will be described in detail with reference to the drawings.

First Exemplary Embodiments

Figure 1:
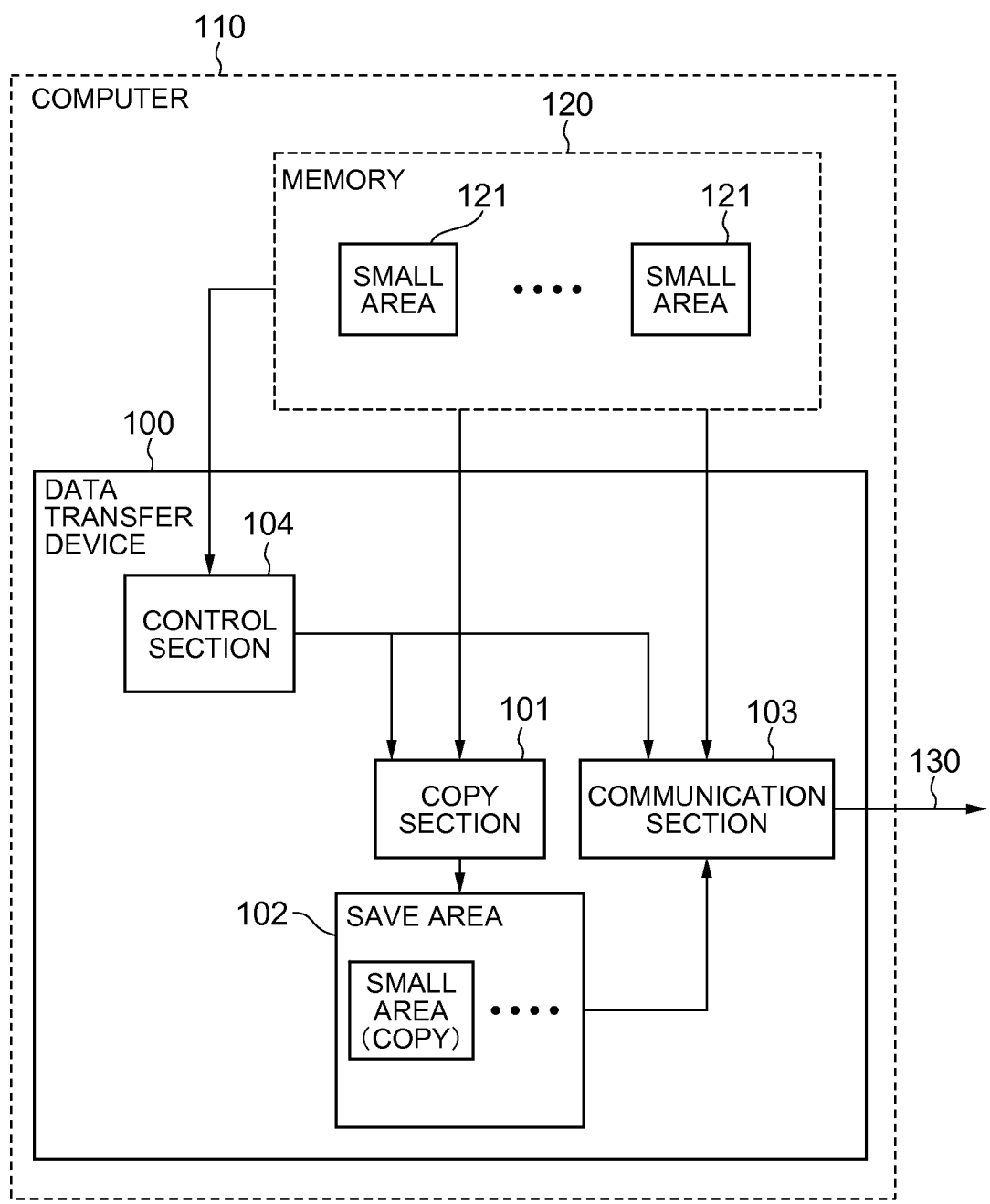
FIG. 1 is a block diagram showing a first exemplary embodiment of the present invention.

Referring to FIG. 1, a data transfer device 100 according to a first exemplary embodiment of the present invention is provided to a computer 110 as a component of the computer.

The data transfer device 100 has a function of transmitting data stored in the memory 120 of the computer 110 to the outside of the computer. The memory 120 is, for example, a main memory of the computer 110. The memory 120 is managed by being divided into a plurality of small areas 121. A small area may be a page or a segment.

The data transfer device 100 includes a copy section 101, a save area 102, a communication section 103, and a control section 104. The copy section 101 has a function of creating a copy of data. The save area 102 is a storage area for saving data temporarily. The save area 102 may be formed on the main memory of the computer 110, or on an independent memory other than the main memory. The communication section 103 has a function of transmitting data to the outside of the own computer via a communication channel 130. The communication channel 130 may be a dedicated communication channel, or a public communication channel such as the Internet.

The control section 104 controls transfer of stored data in the memory 120 to the outside of the own computer. More specifically, the control section 104 has a function of selecting, from among the small areas 121 which are transfer targets in the memory 120, a small area to be transferred to the outside of the own computer through the save area 102 as an indirect transfer small area, and a small area to be transferred to the outside of the own computer not through the save area 102 as a direct transfer small area, respectively. The control section 104 also has a function of copying stored data in the small area 121 selected as an indirect transfer small area, from the memory 120 to the save area 102 with use of the copy section 101 during the period in which updating from the own computer to the memory 120 is suspended, and in parallel to the copying, transferring the stored data in the small area 121 selected as a direct transfer small area, from the memory 120 to the outside of the own computer with use of the communication section 103. Further, the control section 104 also has a function of transferring the stored data in the small area 121 copied to the save area 102, from the save area 102 to the outside of the own computer with use of the communication section 103.

Figure 2:
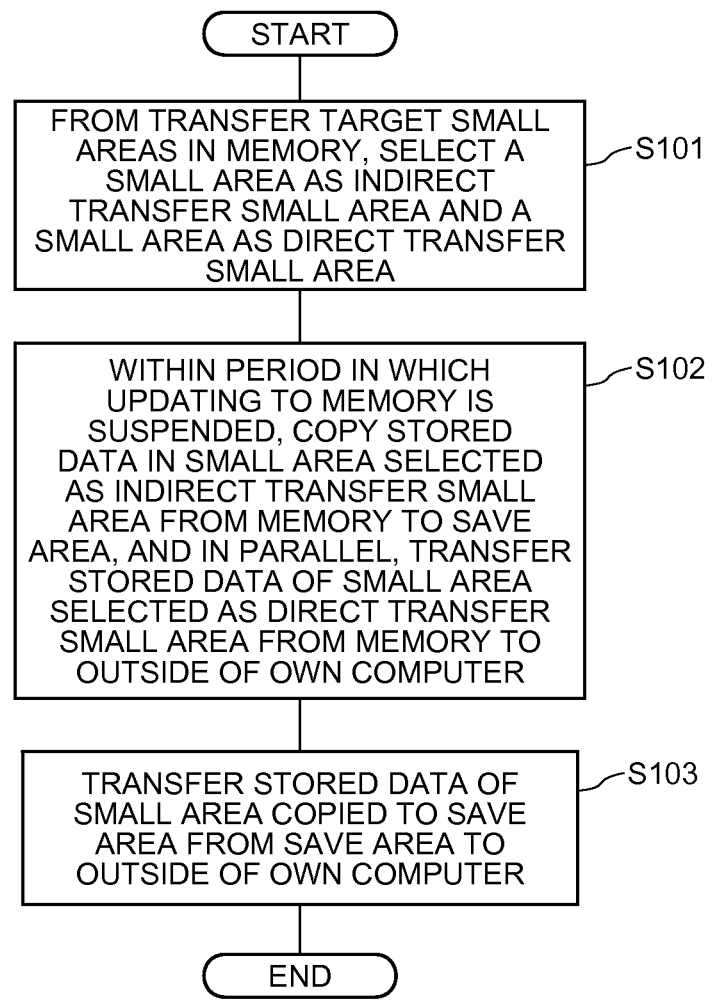
FIG. 2 is a flowchart showing operational procedures of the first exemplary embodiment of the present invention.

Next, operation of the present embodiment will be described. FIG. 2 is a flowchart showing the operational procedures of the present embodiment.

The control section 104 of the data transfer device 100 starts controlling for executing a series of processing shown in FIG. 2, each time a checkpoint comes. First, the control section 104 selects, from among a plurality of small areas 121 which are transfer targets in the memory 120, a small area to be transferred to the outside of the own computer through the save area 102 in the own computer (indirect transfer small area), and a small area to be transferred to the outside of the own computer not through the save area 102 (direct transfer small area) (step S101).

Next, within the period in which updating from the own computer to the memory 120 is suspended, the control section 104 copies the stored data in the small area 121 selected as an indirect transfer small area from the memory 120 to the save area 102 with use of the copy section 101, and in parallel to the copying, transferring the stored data in the small area 121 selected as a direct transfer small area from the memory 120 to the outside of the own computer with use of the communication section 103 (step S102).

Then, the control section 104 transfers the stored data in the small area 121, copied to the save area 102, from the save area 102 to the outside of the own computer with use of the communication section 103 (step S103).

Figure 3:
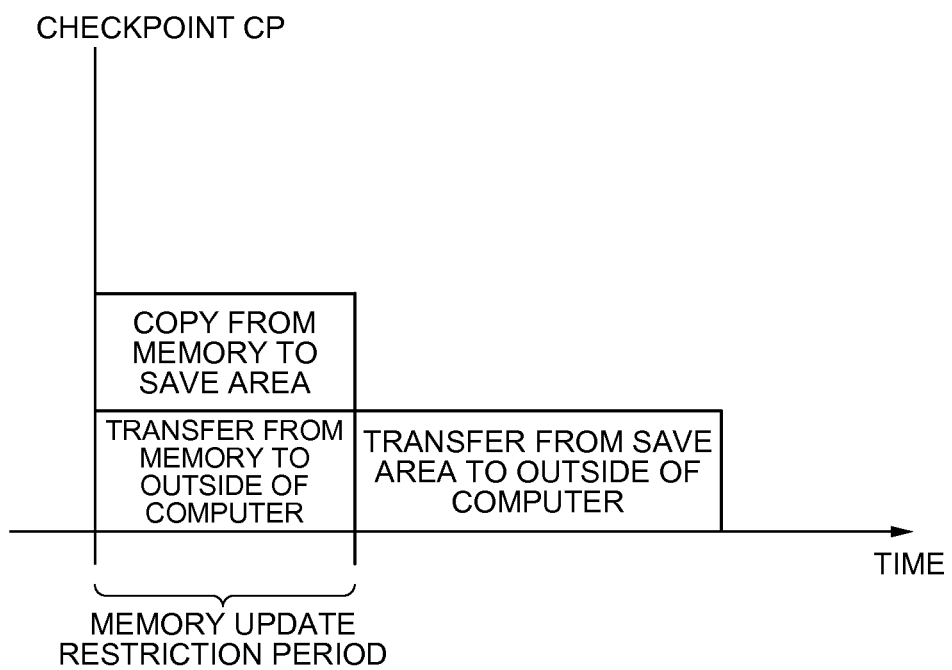
FIG. 3 is a time chart showing a state where memory copying and a transfer operation are performed in parallel in the first exemplary embodiment of the present invention.

FIG. 3 is a time chart showing a state where memory copying and a transfer operation are performed in parallel in the present embodiment. Referring to FIG. 3, in the present embodiment, if there are a plurality of small areas 121, which are transfer targets, at a point of time of any checkpoint CP, an operation to copy stored data in a small area 121 from the memory 120 to the save area 102 and an operation to transfer stored data in a small area 121 from the memory 12 to the outside of the computer are performed in parallel. If all of the small areas 121, which are transfer targets, on the memory 120 have been copied to the save area 102 or have been transferred to the outside of the computer, there is no need to restrict updating of the small areas 121 which are the transfer targets on the memory 120. This means that a period in which updating of the memory 120 must be suspended is a period from the point of time of a checkpoint CP up to the time when an operation of copying stored data in the small areas 121 from the memory 120 to the save area 102 has been completed and an operation of transferring stored data in the small areas 121 from the memory 120 to the outside of the computer has been completed.

Here, it is assumed that a time required for copying stored data in one small area 121 from the memory 120 to the save area 102 is Tc, and that a time required for transmitting stored data in one small area 121 from the memory 120 to the outside of the computer is Ts. It is also assumed that the number of small areas 121 which are transfer targets is n, and among them, the number of small areas 121 to be copied to the save area 102 is m (<n). Here, a memory update restriction period of the present embodiment is given by the following expression:

$$\max(mTc, (n-m)Ts) \quad (1)$$

where max(X, Y) represents the maximum value of X and Y.

Accordingly, the memory update restriction period can be minimized by setting the value of m, namely the number m of the indirect transfer small areas and the number (n−m) of the direct transfer small areas, so as to minimize the memory update restriction period given by Expression (1). In the present invention, however, it is not necessary to minimize the period. The number m may take any value if the necessary memory update restriction period becomes shorter in the case where some of the small areas 121 to be transferred are handled as direct transfer small areas and the remaining areas are handled as indirect transfer small areas, compared with the case where all of the small areas 121 to be transferred are handled as indirect transfer small areas.

Some specific methods for setting the number m of indirect transfer small areas and the number (n−m) of direct transfer small areas so as to minimize the memory update restriction period given by Expression (1), can be considered.

For example, the control section 104 may calculate the number m which minimizes the value of Expression (1), with use of the number n of the small areas 121 to be transferred which is determined at the time of a checkpoint CP and the values of Tc and Ts having been stored.

It is also possible not to calculate the number m of indirect transfer small areas and the number (n−m) of direct transfer small areas in advance but to control so as to realize local copying and data transfer in parallel with such a value of m, consequently. Specifically, the control section 104 first selects one small area 121 as an indirect transfer small area and one small area as a direct transfer small area from among a plurality of small areas 121 which are transfer targets in the memory 120. Then, each time processing to copy the stored data in the small area 121, selected as the indirect transfer small area, from the memory 120 to the save area 102 has been completed, if there remains a small area 121, which is a transfer target, not having been selected as an indirect transfer small area or a direct transfer small area, the control section 104 selects the next small area 121 to be handled as an indirect transfer small area. Further, each time processing to transfer the stored data in the small area 121, selected as the direct transfer small area, from the memory 120 to the outside of the own computer has been completed, if there remains a small area 121, which is a transfer target, not having been selected as an indirect transfer small area or a direct transfer small area, the control section 104 selects the next small area 121 to be handled as a direct transfer small area.

As described above, according to the present embodiment, the memory update restriction period when transferring the memory content at a certain point of time to the outside of the computer can be shortened, whereby the performance of the computer can be improved.

This is because in parallel to an operation to copy stored data in a small area 121 from the memory 120 to the save area 102, an operation to transfer stored data in another small area 121 from the memory 120 to the outside of the own computer is performed. As such, compared with the case of copying all small areas 121, which are transfer targets, from the memory 120 to the save area 102, the total copying time can be shorted by the number of small areas to be transferred from the memory 120 not through the save area 102.

Second Exemplary Embodiment

Next, an FT server according to a second exemplary embodiment of the present invention will be described.

Figure 4:
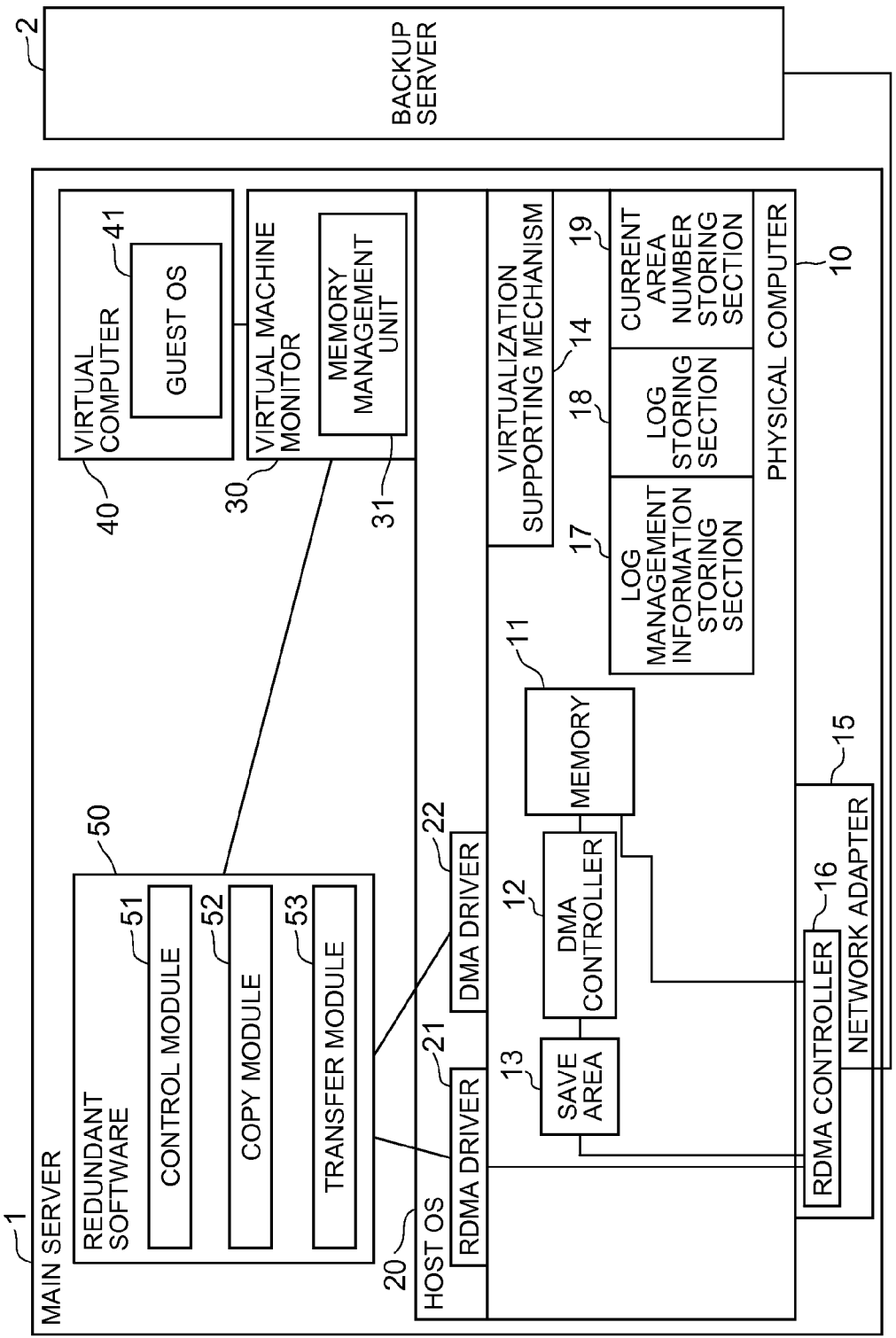
FIG. 4 is a block diagram showing a second exemplary embodiment of the present invention.

Referring to FIG. 4, an FT server according to the present embodiment includes a main server 1 and a backup server 2. The main server 1 is a server which executes operations at normal times, and the backup server 2 is a server which succeeds the operation executed by the main server 1 when a failure occurs in the main server 1. In order to enable succession of an operation to the backup server 2, the main server 1 transmits the content of pages (dirty pages) on the memory updated after the previous checkpoint to the backup server 2 each time a checkpoint comes, so as to make the contents of the both servers 1 and 2 conform with each other. As such, the present embodiment is a checkpoint-based FT server.

The main server 1 having such a function includes a physical computer 10, a host OS 20 operating on the physical computer 10, a virtual machine monitor 30 and redundant software 50 operating on the host OS 20, and a virtual computer 40 operating on the virtual machine monitor 30.

The physical computer 10 includes a memory 11, a DMA (Direct Memory Access) controller 12, a save area 13, a virtualization supporting mechanism 14 provided in the CPU (not shown), a network adapter 15 having an RDMA (Remote Direct Memory Access) controller 16 inside thereof, a log management information storing section 17, a log storing section 18, and a current area number storing section 19. Here, the memory 11 shows a part, of the memory (main memory) provided in the physical computer 10, assigned to the virtual computer 40. In other words, the memory 11 represents a state of the virtual computer 40. Further, the log management information storing section 17, the log storing section 18, and the current area number storing section 19 are provided to the memory (main memory) in the physical computer 10, for example.

The host OS 20 includes an RDMA driver 21 for the RDMA controller 16, and a DMA driver 22 for the DMA controller 12.

The virtual machine monitor 30 provides the virtual computer 40 having a guest OS 41, and includes a memory management unit 31. The memory management unit 31 has a function of managing a dirty bit showing whether or not each page is dirty. The memory management unit 31 initializes, at a checkpoint, all of the dirty bits corresponding to the pages of the memory 11 to "0" (not dirty), and then each time a page of the memory 11 is updated, sets the dirty bit corresponding to such a page to "1" (dirty). As such, when the next checkpoint comes, by checking the dirty bits of all of the pages corresponding to the memory 11, it is possible to obtain a list of all of the pages of the memory 11 having been updated from the previous checkpoint to the checkpoint of this time. In this method, however, as all of the dirty bits must be scanned after the checkpoint, it is impossible to obtain a list of dirty pages immediately at the checkpoint. As such, in the present embodiment, each time a new page in the memory 11 is updated by the guest OS 41 in a period from the previous checkpoint to the checkpoint of this time, the memory management unit 31 records the page number (beginning address of the dirty page) of such a page in the log storing section 18, whereby a list of the dirty pages has been generated in the log storing section 18 when the checkpoint comes. It should be noted that the beginning address and the length of a list of dirty pages to be recorded in the log storing section 18 are adapted to be stored in the log management information storing section 17.

The function of dynamically generating a list of dirty pages of the memory 11, assigned to the virtual computer 40, on the memory which can be referred to from the redundancy software 50 during the operation of the virtual computer 14, as described above, is called a dirty page logging function. While the virtual machine monitor 30 has the dirty page logging function in the present embodiment, it is possible that the virtualization supporting mechanism 14 may have the dirty page logging function.

The redundant software 50 is software which cooperates with redundant software, not shown, in the backup server 2 to cause the main server 1 and the backup server 2 to function as FT servers. The redundant software 50 on the side of the main server 1 has a function as a control unit which controls transfer of stored data in the memory 11 to the outside of the main server 1. More specifically, the redundant software 50 includes a control module 51, a copy module 52, and a transfer module 53.

The control module 51 has a function of suspending the virtual computer 40 and a function of activating the copy module 52 and the transfer module 53, at checkpoints. The control module 51 also has a function of resuming processing of the virtual computer 40 when processing performed by the copy module 52 and the transfer module 53 has been completed, and a function of instructing the DMA driver 22 to transfer data copied (locally copied) to the save area 13 by the copy module 52.

The copy module 52 has a function of copying the content of partial dirty pages in the memory 11 locally, with reference to a list of dirty pages stored in the log storing section 18, from the memory 11 to the save area 13 by using the DMA driver 22 and the DMA controller 12.

The transfer module 53 has a function of transferring (directly transferring) the content of other partial dirty pages in the memory 11, with reference to a list of dirty pages stored in the log storing section 18, from the memory 11 to the backup server 2 by using the RDMA driver 21 and the RDMA controller 16.

In the present embodiment, in order that local copying by the copy module 52 and direct transfer by the transfer module 53 are performed in parallel on different dirty pages in the memory 11 respectively, the copy module 52 acquires dirty pages, which are targets of local copy processing, in sequence from the head to the end of the list 18A of dirty pages stored in the log storing section 18, while the transfer module 53 reversely acquires dirty pages, which are targets of direct transfer processing, in sequence from the end to the head of the list. Further, in order that each of the modules 52 and 53 is able to know the progress of processing performed by the other module, the copy area number representing up to which page of the list of dirty pages local copy processing has been completed, and the transfer area number representing up to which page direct transfer processing has been competed, are recorded in the current area number storing section 19.

Next, operation of the present embodiment will be described.

Figure 5:
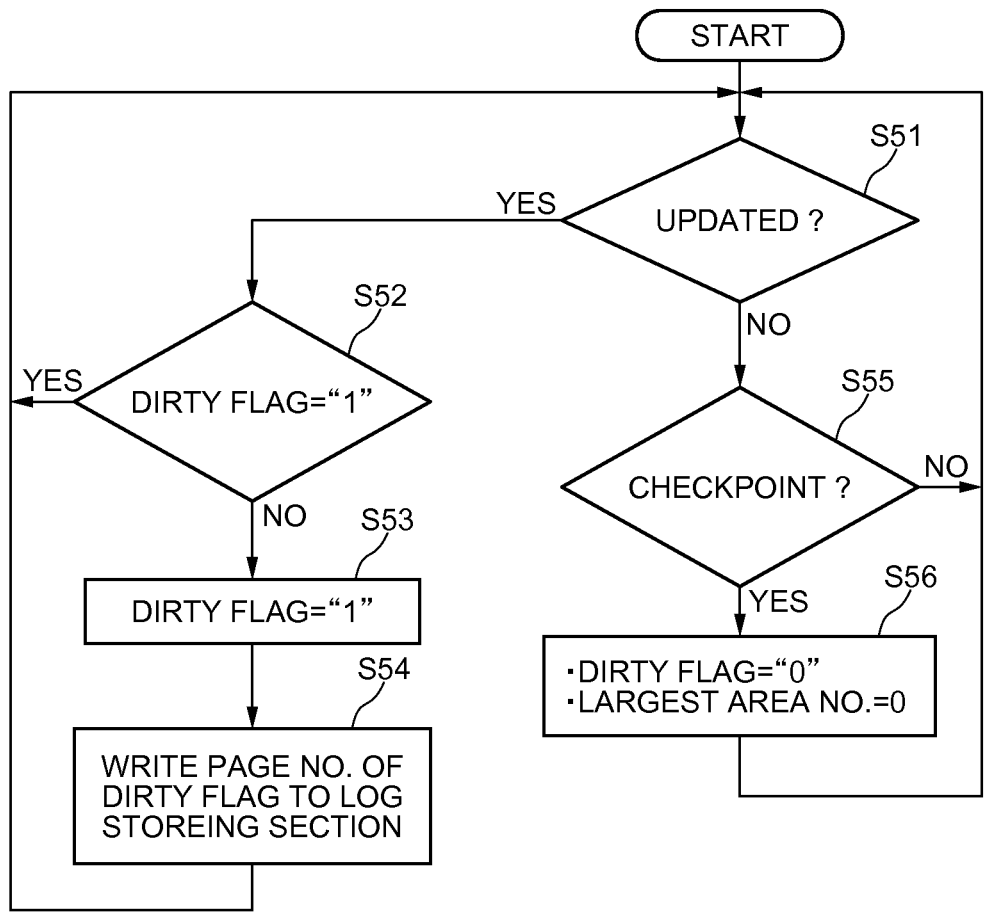
FIG. 5 is a flowchart showing operational procedures of the memory management unit in the second exemplary embodiment of the present invention.

First, operation of the memory management unit 31 will be described. FIG. 5 is a flowchart showing the operational procedures of the memory management unit 31.

When a page on the memory 11 is updated by the guest OS 41 (Yes at step S51), the memory management unit 31 determines whether or not a dirty flag corresponding to the page is set to "1" (step S52). A dirty flag shows whether or not a corresponding page is a dirty page, and in the present embodiment, a dirty flag corresponding to a dirty page is set to "1".

Figure 6:
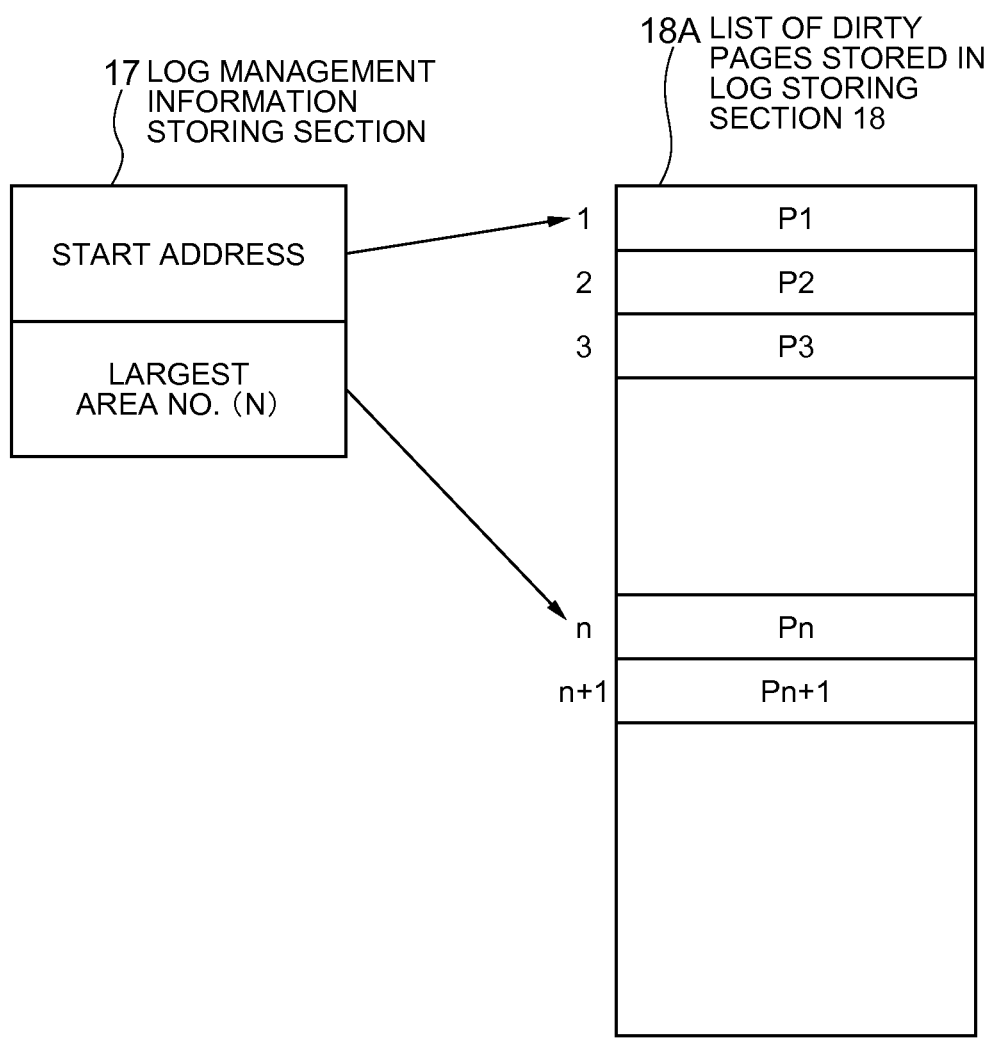
FIG. 6 is a diagram for explaining the log management information storing section and the log storing section in the second exemplary embodiment of the present invention.

If the dirty flag is "0" (No at step S52), the memory management unit 31 changes the dirty flag corresponding to the page to "1" (step S53) in order to show that the page becomes a dirty page, and writes the page number (Pk, for example) of the page on the list of dirty pages in the log storing section 18 (step S54), and then performs processing of step S51 again. Here, the processing at step S54 will be described in detail with reference to FIG. 6. FIG. 6 shows an example of the list 18A of dirty pages stored in the log storing section 18, and an example of information stored in the log management information storing section 17.

First, the memory management unit 31 accepts a start address indicating the beginning of the list 18A of dirty pages and a largest area number indicating the end of the list, from the log management information storing section 17. Then, the memory management unit 31 increments (+1) the largest area number, and in the area of the list 18A indicated by the largest area number after the increment, writes the page number "Pk" of the dirty page of this time, and also writes the largest area number after the increment into the log management information storing section 17. For example, if the largest area number accepted from the log management information storing section 17 is "n" as shown in FIG. 6, the memory management unit 31 writes the page number "Pk" of the dirty page in the area of the area number "(n+1)". This is the processing performed at step S54.

On the other hand, if the dirty flag is "1" (Yes at step S52), as the page number "Pk" of the page has been written on the dirty page list 18 in the log storing section 18, the memory management unit 31 returns to the processing of step S51.

Further, when a checkpoint comes (Yes at step S55), the memory management unit 31 initializes the dirty flags of all of the pages to "0", and after initializing the largest area number in the log management information storing section 17 to "0" (step S56), returns to the processing of step S51.

Figure 7:
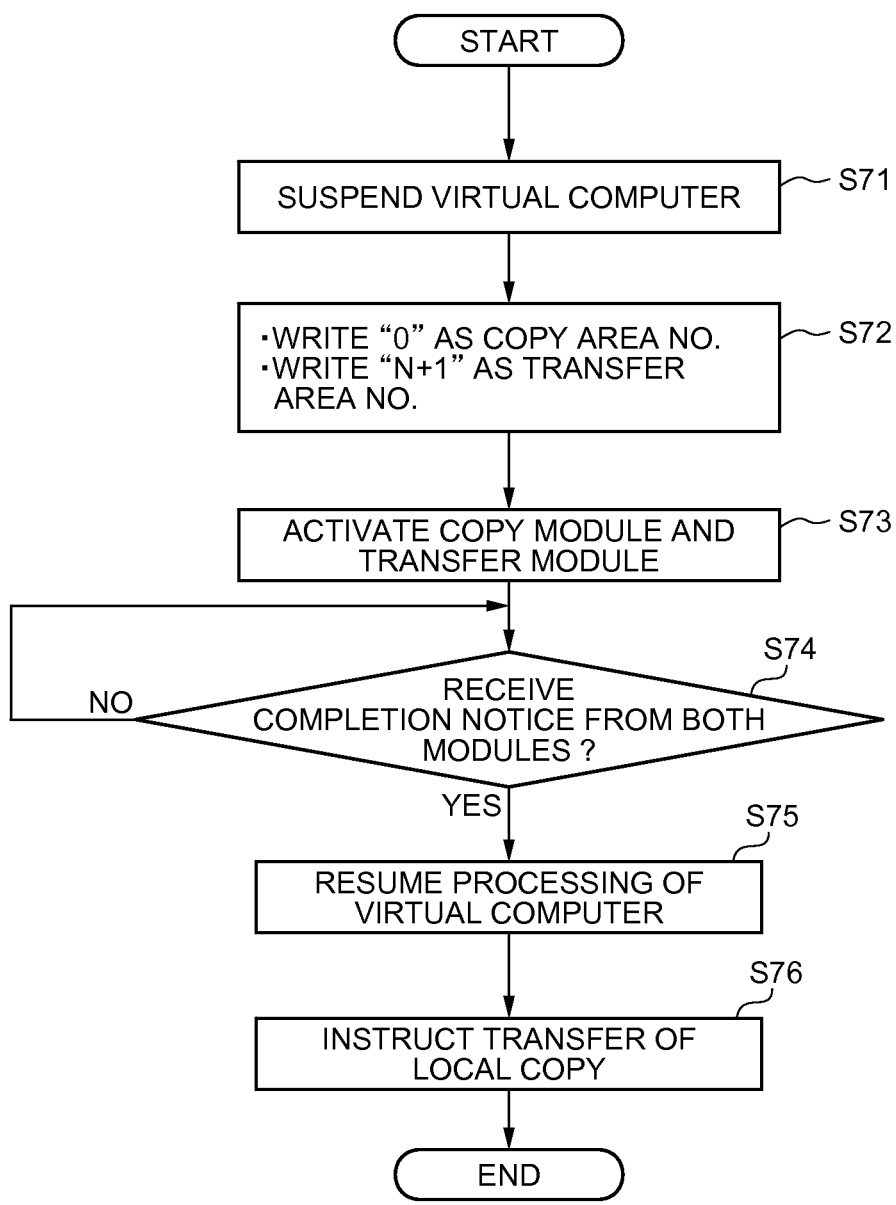
FIG. 7 is a flowchart showing operational procedures of the control module in the second exemplary embodiment of the present invention.
Figure 8:
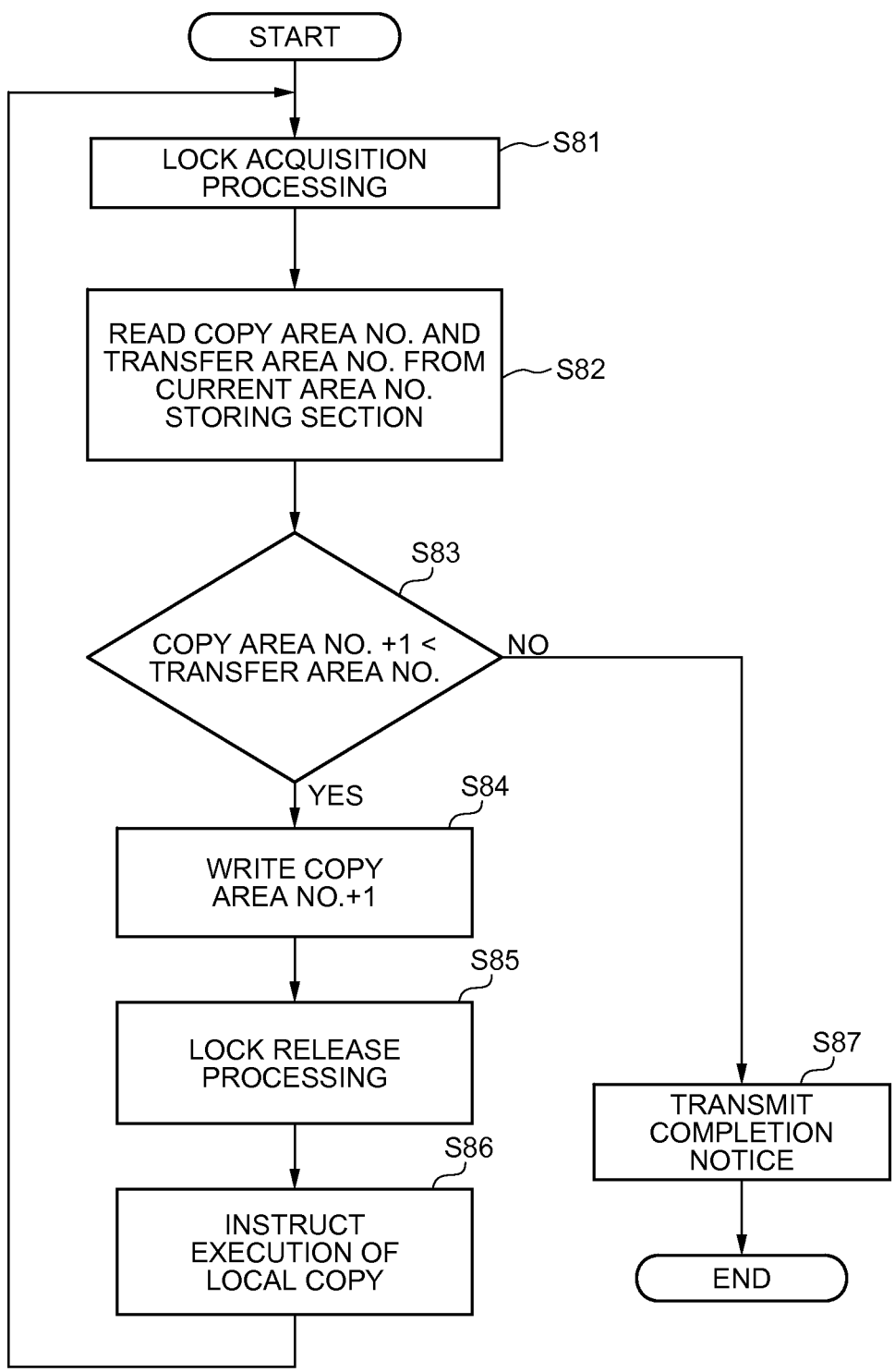
FIG. 8 is a flowchart showing operational procedures of the copy module in the second exemplary embodiment of the present invention.
Figure 9:
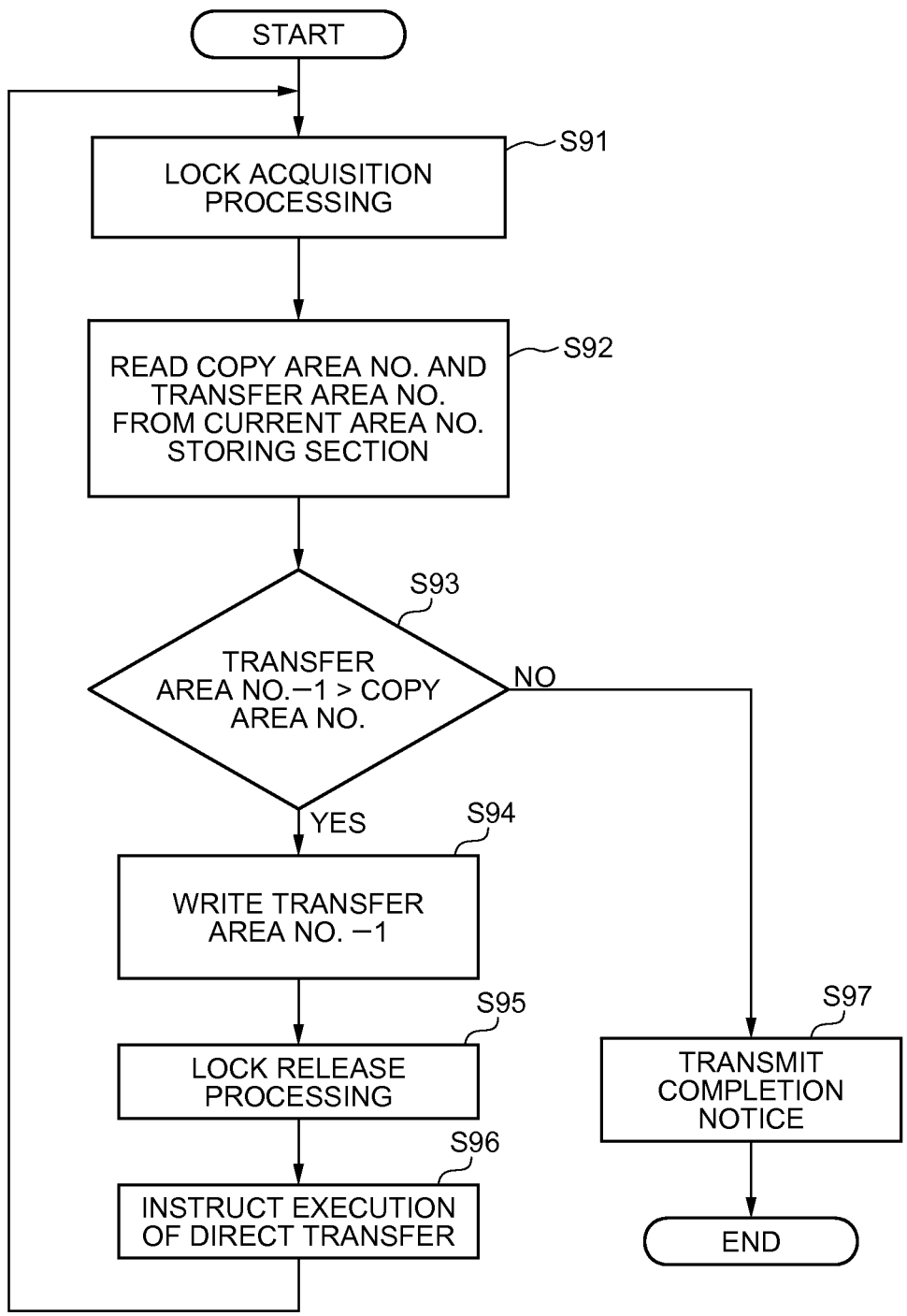
FIG. 9 is a flowchart showing operational procedures of the transfer module in the second exemplary embodiment of the present invention.

Next, operation of the control module 51, the copy module 52, and the transfer module 53 in the redundant software 50 will be described. FIGS. 7, 8, and 9 are flowcharts showing the operational procedures of the control module 51, the copy module 52, and the transfer module 53, respectively.

Figure 10:
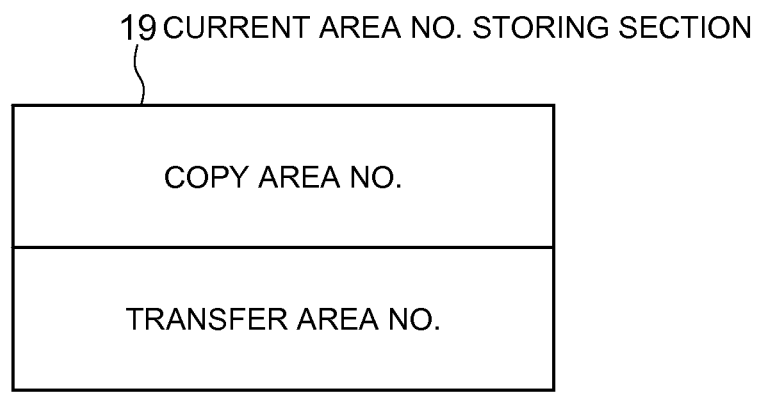
FIG. 10 is a diagram for explaining the current region number storing section in the second exemplary embodiment of the present invention.

When a checkpoint comes, the control module 51 suspends the virtual computer 40 (step S71 in FIG. 7) to restrict updating of the memory 11. Next, the control module 51 stores, in the current area number storing section 19, a value obtained by subtracting 1 from the start address of the dirty page list 18A generated in the log storing section 18 at the time of the checkpoint and a value obtained by adding 1 to the final address (largest area number), as initial values of the copy area number and the transfer area number (step S72, see FIG. 10). The final address (largest area number) of the dirty page list 18A is input from the log management information storing section 17.

Then, the control module 51 activates the copy module 52 and the transfer module 53 (step S73), and waits for completion notices to be transmitted from both modules 52 and 53 (step S74).

When the copy module 52 is activated, the copy module 52 performs lock acquisition processing to exclusively access the current area number storing section 19 (step S81). As a lock mechanism for exclusive control is a well-known technique in the field of computers, the detailed description thereof will not be provided herein. Only when the copy module 52 succeeds in the lock acquisition processing, the copy module 52 proceeds to the processing of step S82 and after, while when fails in the lock acquisition processing, the copy module attempts to perform lock acquisition processing again after a certain time period has passed.

At step S82, the copy module 52 reads the copy area number and the transfer area number from the current area number storing section 19. Next, the copy module 52 compares the value after incrementing (+1) the readout copy area number with the readout transfer area number (step S83). If the incremented copy area number is smaller than the transfer area number (Yes at step S84), a dirty page on the dirty page list 18A shown by the copy area number after the increment may be a target of local copy. As such, the copy module 52 rewrites the copy area number, stored in the current area number storing section 19, to the copy area number after the increment (step S84), and after performing processing to release the acquired lock (step S85), instructs the DMA driver 22 to execute local copy of the dirty page, which is the target of local copy, from the memory 11 to the save area 13 (step S86). Then, upon receipt of a notice indicating that DMA transfer has been completed from the DMA driver 22, the copy module 52 returns to the processing of step S81.

Here, an example of processing performed at step S86 will be described below. First, the copy module 52 accepts a page number on the dirty page list 18A in the log storing section 18, shown by the copy area number after the increment. This page number corresponds to the start address of the dirty page to be copied locally this time. Next, the copy module 52 obtains the transfer destination address (start address) based on the beginning address of the save area 13, the number of times of copying (initial value is 0) up to the current time held by the self module 52, and the page size. More specifically, the start address of the transfer destination is obtained by performing an operation of (beginning address of the save area 13)+(page size)*(the number of times of copying).

Then, the copy module 52 outputs, to the DMA driver 22, a transfer instruction in which the start address of the dirty page to be copied locally this time is designated as the start address of the transfer source, the page size is designated as the length, and the address calculated in the above-described operation is designated as the start address of the transfer destination. Thereby, the DMA driver 22 controls the DMA controller 12 to copy the content of one dirty page on the memory, shown by the start address of the transfer source, to the save area 13 (DMA transfer). Completion of the DMA transfer is notified to the copy module 52 from the DMA controller 12 via the DMA driver 22. The copy module 52 increments the number of times of copying by 1. This is an example of the processing performed at step S86.

Meanwhile, if, at step S83, the copy module 52 determines that the incremented copy area number is the transfer area number or larger, as there is no dirty page to be copied locally any more, the copy module 52 transmits a completion notice to the control module 51 (step S87), and ends the processing performed by itself. The completion notice includes the number of times of copying held by the copy module 52 or the final copy position of the save area 13.

On the other hand, when the transfer module 53 is activated by the control module 51, the transfer module 53 performs lock acquisition processing to exclusively access the current area number storing section 19 (step S91 in FIG. 9), and when acquiring a lock successfully, the transfer module 53 reads the copy area number and the transfer area number from the current area number storing section 19 (step S92).

Then, the transfer module 53 compares the readout copy area number with the value decremented by 1 from the readout transfer area number (step S93). If the value decremented by 1 from the transfer area number is larger than the copy area number (Yes at step S39), a dirty page on the dirty page list 18A shown by the transfer area number after the decrement may be a target of direct transfer. As such, the transfer module 53 rewrites the transfer area number, stored in the current area number storing section 19, to the transfer area number after the decrement (step S94), and after performing processing to release the acquired lock (step S95), instructs the RDMA driver 21 to execute RDMA transfer of the dirty page, which is the direct transfer target, from the memory 11 to the backup server 2 (step S96). Then, upon receipt of a completion notice of RDMA transfer from the RDMA driver 21, the transfer module 53 returns to the processing of step S91.

Here, an example of processing performed at step S96 will be described below. First, the transfer module 53 accepts a page number on the dirty page list 18A in the log storing section 18, shown by the transfer area number in the current area number storing section 19. This page number corresponds to the start address of the dirty page. Then, the transfer module 53 outputs, to the RDMA driver 21, a transfer instruction including the start address of the transfer source, the length (page size), and information showing the transfer destination (information showing the backup server 2). Thereby, the RDMA driver 21 controls the RDMA controller in the network adapter 15 to transmit the content of the dirty page on the memory 11, shown by the start address and the length, to the backup server 2 (RDMA transfer). This is an example of the processing performed at step S96.

Meanwhile, at step S93, if the transfer module 53 determines that the transfer area number is the copy area number or smaller, as there is no dirty page to be transferred directly any more, the transfer module 53 transmits a completion notice to the control module 51 (step S97) and ends the processing performed by itself.

When the control module 51, waiting for completion notices from the copy module 52 and the transfer module 53, receives completion notices from both modules 52 and 53

(Yes at step S74 in FIG. 7), the control module 51 resumes processing by the virtual computer 40 (step S75). Then, the control module 51 transfers the content of the dirty page copied locally to the save area 13, from the save area 13 to the backup server 2 by using the RDMA driver 21 and the RDMA controller 16 in the network adapter 15 (step S76), and then ends the processing.

Here, an example of the processing performed at step S76 will be described below. The control module 51 first calculates the total value of the lengths of dirty pages on which RDMA transfer will be performed, based on the number of times of copying and the page size included in the completion notice from the copy module 52. More specifically, the control module 51 calculates the total value of the lengths by performing operation of (page size)*(the number of times of copying). Then, the control module 51 outputs, to the RDMA driver 21, a transfer instruction including the start address of the transfer source (beginning address of the save area 13), the total value of the lengths of the dirty pages on which RDMA transfer will be performed, and information showing the transfer destination (information showing the backup server 2). Thereby, the RDMA driver 21 controls the RDMA controller 16 in the network adapter 15 to transmit the content of the dirty pages copied locally to the area on the save area 13, shown by the start address and the total value of the lengths, to the backup server 2 (RDMA transfer). This is an example of the processing performed at step S76.

Figure 11:
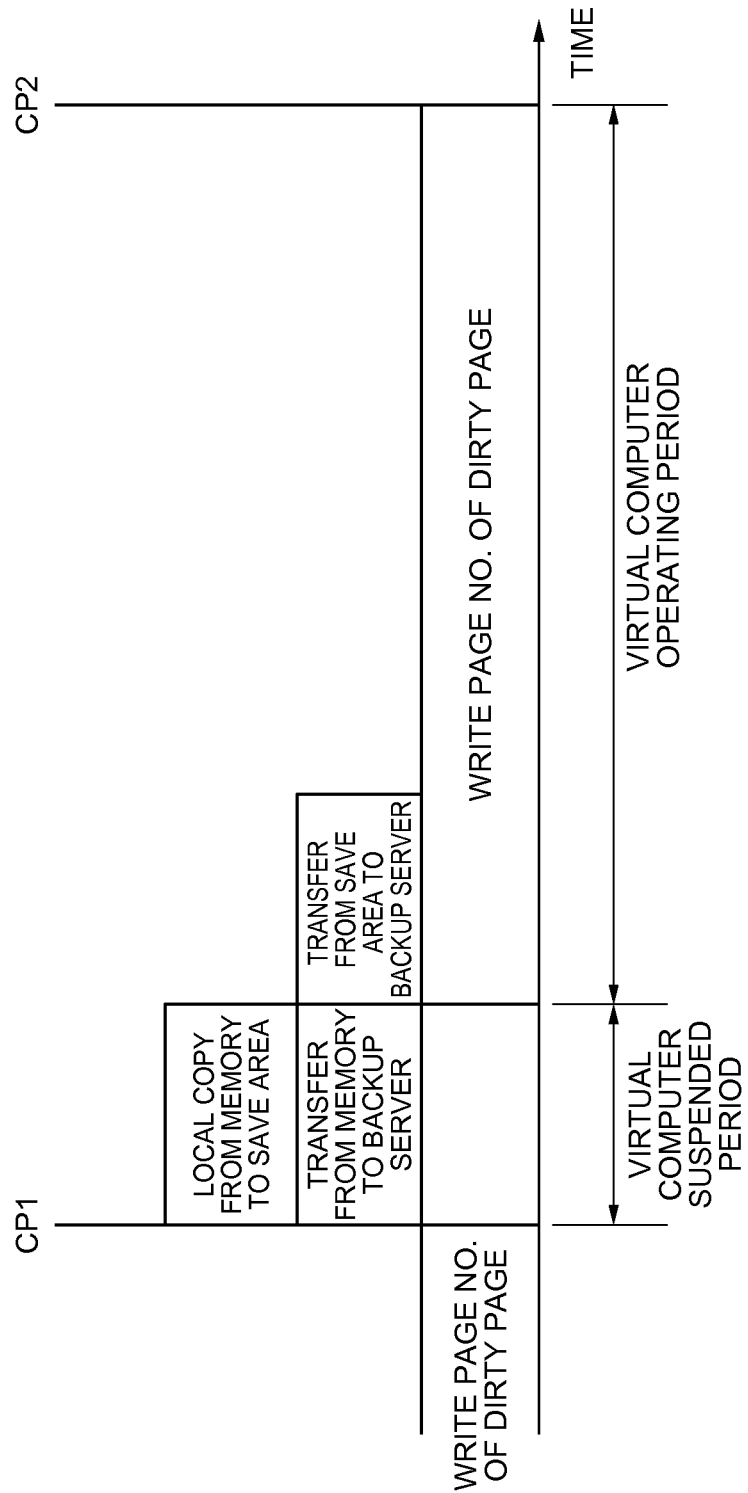
FIG. 11 is a time chart showing a state where memory copying and a data transfer operation are performed in parallel in a virtual computer suspended period, and an address of a dirty page is written in a virtual computer operating period, in the second exemplary embodiment of the present invention.

FIG. 11 is a time chart showing a state where local coping and direct data transfer are performed in parallel in a suspended period of the virtual computer 40, and the page number of a dirty page is stored during operation of the virtual computer 40. Referring to FIG. 11, in the present embodiment, if there are a plurality of dirty pages, which are transfer targets, at a time of any checkpoint CP1, an operation of locally copying data of a dirty page from the memory 11 to the save area 13 and an operation of transferring data of a dirty page from the memory 11 to the backup server 2 are performed in parallel. Then, when the copying operation from the memory 11 to the save area 13 is completed and the transfer operation from the memory 11 to the backup server 2 is completed, the virtual computer 40 becomes an operating state. Then, when the page on the memory 11 is updated by the guest OS 41 running on the operating computer 40, the address of the page (dirty page) is written again on the dirty page list 18A in the log storing section 18, which has been initialized at the time of the checkpoint.

As described above, according to the present embodiment, in the FT server of a checkpoint method, the suspended period of the operating computer, when transferring the content of the memory 11 representing the state of the virtual computer 40 running on the main server 1 from the main server to the backup server 2 at each checkpoint, can be reduced. Thereby, the performance of the operating computer 40 can be improved.

On reason thereof is that in parallel to an operation of copying a dirty page in the memory 11 from the memory 11 to the save area 13, an operation of transferring another dirty page in the memory 11 is performed from the memory 11 to the backup server 2 not through the save area 13, whereby the total copying time is reduced by the number of dirty pages to be transferred from the memory 11 to the backup server 2 not through the save area 12, compared with the case of copying all of the dirty pages from the memory 11 to the save area 13.

Another reason is that as a list of dirty pages has been generated in the log storing section 18 at the time when a checkpoint comes, by the dirty page logging function provided to the memory management unit 31, there is no need to stop the virtual computer to generate a list of dirty pages.

Still another reason is that it is possible to transfer dirty pages from the memory 11 to the backup server 2 not through the save area 13 with use of the RDMA method.

Other Exemplary Embodiments

While, in the second exemplary embodiment, the number of virtual computers 40 operating on the main server 1 is one, a plurality of virtual computers 40 may operate. In the case where a first virtual computer and a second virtual computer operate on the main server 1, stored data in the memory showing a state of the first virtual computer and stored data in the memory showing a state of the second virtual computer are transferred from the main server 1 to the backup server 2 at each checkpoint. At this point, by selecting an indirect transfer small area and a direct transfer small area from the memory showing the state of the first virtual computer, and also selecting an indirect transfer small area and a direct transfer small area from the memory showing the state of the second virtual computer, local copying and direct transfer may be performed in parallel. On the contrary, it is also possible to select all of the small areas of the memory showing the state of the first virtual computer as indirect transfer small areas and select small areas of the memory showing the state of the second virtual computer as direct transfer small areas, and perform local copying and direct transfer in parallel.

Further, while, the processor configuration and the main memory configuration of the main server 1 are not particularly described in the second exemplary embodiment, the present invention is applicable to the main server 1 of a tightly coupled multiprocessor configuration adopting NUMA (Non Uniformed Memory Architecture), as well as the main server 1 of a single processor configuration.

What is claimed is:
1. A data transfer device provided to a computer, the device comprising:
 a copy unit that creates a copy of data;
 a save area used for temporarily saving data;
 a communication unit that transmits data to outside of an own computer; and
 a control unit that controls transfer of stored data in a memory including a plurality of small areas to the outside of the own computer, wherein
 the control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area,
 within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and
 the control unit transfers the stored data in the small areas, having been copied to the save area, from the save area to the outside of the own computer with use of the communication unit, wherein in the selection, the copying of the stored data in the indirect transfer small areas to the save area, and the transfer of the stored data in the direct transfer small areas to the outside of the own computer, the control unit selects one of the small areas as the indirect transfer small area and one of the small areas as the direct transfer small area, from among the plurality of the small areas which are transfer targets in the memory, each time processing to copy stored data in the small area, selected as the indirect transfer small area, from the memory to the save area is completed, if there remains any of the small areas which are transfer targets not having been selected as the indirect transfer small area or the direct transfer small area, the control unit selects next one of the small areas as the indirect transfer small area, and each time processing to transfer stored data in the small area, selected as the direct transfer small area, from the memory to the outside of the own computer is completed, if there remains any of the small areas which are transfer targets not having been selected as the indirect transfer small area or the direct transfer small area, the control unit selects next one of the small areas as the direct transfer small area.

2. A data transfer device provided to a computer, the device comprising:

a copy unit that creates a copy of data;

a save area used for temporarily saving data;

a communication unit that transmits data to outside of an own computer; and a control unit that controls transfer of stored data in a memory including a plurality of small areas to the outside of the own computer, wherein the control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area, within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and the control unit transfers the stored data in the small areas, having been copied to the save area, from the save area to the outside of the own computer with use of the communication unit, wherein in the selection, the control unit divides the plurality of the small areas which are transfer targets in the memory into two, namely the indirect transfer small areas and the direct transfer small areas, and when dividing the small areas into two, the control unit divides the small areas in such a manner as to minimize a maximum value of a time required for copying stored data in all of the small areas selected as the indirect transfer small areas from the memory to the save area with use of the copy unit, and a time required for transferring stored data in all of the small areas selected as the direct transfer small areas from the memory to the outside of the own computer with use of the communication unit.

3. The data transfer device, according to claim 1, further comprising:

a log storing unit that stores a list of the small areas having been updated after a previous checkpoint; and a memory management unit that updates the list when any of the small areas in the memory are updated, wherein the control unit selects the indirect transfer small areas and the direct transfer small areas with reference to the list.

4. The data transfer device, according to claim 1, wherein the communication unit transfers data by RDMA transfer.

5. The data transfer device, according to claim 1, wherein the communication unit is a network adapter.

6. The data transfer device, according to claim 1, wherein the copy unit copies data to the save area by DMA transfer.

7. The data transfer device, according to claim 1, wherein the computer is a computer of a main system constituting an FT server, and the outside of the own computer is a computer of a backup system constituting the FT server.

8. A data transfer method for transferring stored data, in a memory including a plurality of small areas, to outside of a computer, the method comprising:

selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area, within a period in which updating from the own computer to the memory is suspended, copying stored data in the small areas selected as the indirect transfer small areas from the memory to the save area, and in parallel to the copying, transferring stored data in the small areas selected as the direct transfer small areas from the memory to the outside of the own computer, and transferring the stored data in the small areas, having been copied to the save area, from the save area to the outside of the own computer, wherein the selecting, the copying of the stored data in the indirect transfer small areas to the save area, and the transferring of the stored data in the direct transfer small areas to the outside of the own computer include:

selecting one of the small areas as the indirect transfer small area and one of the small areas as the direct transfer small area, from among the plurality of the small areas which are transfer targets in the memory;

each time processing to copy stored data in the small area, selected as the indirect transfer small area, from the memory to the save area is completed, if there remains any of the small areas which are transfer targets not having been selected as the indirect transfer small area or the direct transfer small area, selecting next one of the small areas as the indirect transfer small area; and each time processing to transfer stored data in the small area, selected as the direct transfer small area, from the memory to the outside of the own computer is completed, if there remains any of the small areas which are transfer targets not having been selected as the indirect transfer small area or the direct transfer small area, selecting next one of the small areas as the direct transfer small area.

9. A data transfer method, for transferring stored data, in a memory including a plurality of small areas, to outside of a computer, the method comprising:

selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area, within a period in which updating from the own computer to the memory is suspended, copying stored data in the small areas selected as the indirect transfer small areas from the memory to the save area, and in parallel to the copying, transferring stored data in the small areas selected as the direct transfer small areas from the memory to the outside of the own computer, and transferring the stored data in the small areas, having been copied to the save area, from the save area to the outside of the own computer, wherein the selecting includes dividing the plurality of the small areas which are transfer targets in the memory into two, namely the indirect transfer small areas and the direct transfer small areas, the dividing the small areas into two including dividing the small areas in such a manner as to minimize a maximum value of a time required for copying stored data in all of the small areas selected as the indirect transfer small areas from the memory to the save area, and a time required for transferring stored data in all of the small areas selected as the direct transfer small areas from the memory to the outside of the own computer.

10. A computer comprising:

a memory including a plurality of small areas;

a copy unit that creates a copy of data;

a save area used for temporarily saving data;

a communication unit that transmits data to outside of an own computer; and a control unit that controls transfer of stored data in the memory to the outside of the own computer, wherein the control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area, within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and the control unit transfers the stored data in the small areas, having been copied to the save area, from the save area to the outside of the own computer with use of the communication unit, wherein in the selection, the copying of the stored data in the indirect transfer small areas to the save area, and the transfer of the stored data in the direct transfer small areas to the outside of the own computer, the control unit selects one of the small areas as the indirect transfer small area and one of the small areas as the direct transfer small area, from among the plurality of the small areas which are transfer targets in the memory, each time processing to copy stored data in the small area, selected as the indirect transfer small area, from the memory to the save area is completed, if there remains any of the small areas which are transfer targets not having been selected as the indirect transfer small area or the direct transfer small area, the control unit selects next one of the small areas as the indirect transfer small area, and each time processing to transfer stored data in the small area, selected as the direct transfer small area, from the memory to the outside of the own computer is completed, if there remains any of the small areas which are transfer targets not having been selected as the indirect transfer small area or the direct transfer small area, the control unit selects next one of the small areas as the direct transfer small area.

11. A computer comprising:

a memory including a plurality of small areas;

a copy unit that creates a copy of data;

a save area used for temporarily saving data;

a communication unit that transmits data to outside of an own computer; and a control unit that controls transfer of stored data in the memory to the outside of the own computer, wherein the control unit selects some of a plurality of the small areas which are transfer targets in the memory as indirect transfer small areas to be transferred to the outside of the own computer through the save area, and selects the others of the plurality of the small areas as direct transfer small areas to be transferred to the outside of the own computer not through the save area, within a period in which updating from the own computer to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the outside of the own computer with use of the communication unit, and the control unit transfers the stored data in the small areas, having been copied to the save area, from the save area to the outside of the own computer with use of the communication unit, wherein in the selection, the control unit divides the plurality of the small areas which are transfer targets in the memory into two, namely the indirect transfer small areas and the direct transfer small areas, and when dividing the small areas into two, the control unit divides the small areas in such a manner as to minimize a maximum value of a time required for copying stored data in all of the small areas selected as the indirect transfer small areas from the memory to the save area with use of the copy unit, and a time required for transferring stored data in all of the small areas selected as the direct transfer small areas from the memory to the outside of the own computer with use of the communication unit.

12. The computer, according to claim 10, further comprising:

a log storing unit that stores a list of the small areas having been updated after a previous checkpoint; and a memory management unit that updates the list when any of the small areas in the memory are updated, wherein the control unit selects the indirect transfer small areas and the direct transfer small areas with reference to the list.

13. A fault tolerant server comprising:

a main server; and a standby server communicable with the main server, wherein the main server includes:

a memory including a plurality of small areas;

a copy unit that creates a copy of data;

a save area used for temporarily saving data;

a communication unit that transmits data to the backup server; and a control unit that controls transfer of stored data in the memory to the backup server, wherein the control unit selects some of a plurality of the small areas which are transfer targets in the memory as indirect transfer small areas to be transferred to the backup server through the save area, and selects the others of the plurality of the small areas as direct transfer small areas to be transferred to the backup server not through the save area, within a period in which updating from an own server to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the backup server with use of the communication unit, and the control unit transfers the stored data in the small areas, having been copied to the save area, from the save area to the backup server with use of the communication unit, wherein in the selection, the copying of the stored data in the indirect transfer small areas to the save area, and the transfer of the stored data in the direct transfer small areas to the backup server, the control unit selects one of the small areas as the indirect transfer small area and one of the small areas as the direct transfer small area, from among the plurality of the small areas which are transfer targets in the memory, each time processing to copy stored data in the small area, selected as the indirect transfer small area, from the memory to the save area is completed, if there remains any of the small areas which are transfer targets not having been selected as the indirect transfer small area or the direct transfer small area, the control unit selects next one of the small areas as the indirect transfer small area, and each time processing to transfer stored data in the small area, selected as the direct transfer small area, from the memory to the backup server is completed, if there remains any of the small areas which are transfer targets not having been selected as the indirect transfer small area or the direct transfer small area, the control unit selects next one of the small areas as the direct transfer small area.

14. A fault tolerant server comprising:

a main server; and a standby server communicable with the main server, wherein the main server includes:
   a memory including a plurality of small areas;
   a copy unit that creates a copy of data;
   a save area used for temporarily saving data;
   a communication unit that transmits data to the backup server; and
   a control unit that controls transfer of stored data in the memory to the backup server, wherein the control unit selects some of a plurality of the small areas which are transfer targets in the memory as indirect transfer small areas to be transferred to the backup server through the save area, and selects the others of the plurality of the small areas as direct transfer small areas to be transferred to the backup server not through the save area, within a period in which updating from an own server to the memory is suspended, the control unit copies stored data in the small areas selected as the indirect transfer small areas from the memory to the save area with use of the copy unit, and in parallel to the copying, transfers stored data in the small areas selected as the direct transfer small areas from the memory to the backup server with use of the communication unit, and the control unit transfers the stored data in the small areas, having been copied to the save area, from the save area to the backup server with use of the communication unit, wherein in the selection, the control unit divides the plurality of the small areas which are transfer targets in the memory into two, namely the indirect transfer small areas and the direct transfer small areas, and when dividing the small areas into two, the control unit divides the small areas in such a manner as to minimize a maximum value of a time required for copying stored data in all of the small areas selected as the indirect transfer small areas from the memory to the save area with use of the copy unit, and a time required for transferring stored data in all of the small areas selected as the direct transfer small areas from the memory to the backup server with use of the communication unit.

15. The fault tolerant server, according to claim 13, further comprising:

a log storing unit that stores a list of the small areas having been updated after a previous checkpoint; and a memory management unit that updates the list when any of the small areas in the memory are updated, wherein the control unit selects the indirect transfer small areas and the direct transfer small areas with reference to the list.

16. A non-transitory computer readable medium storing a program comprising instructions for causing a computer to function as, the computer including a memory including a plurality of small areas and a save area for temporarily saving data in the memory:

a copy unit that creates a copy of data;

a communication unit that transmits data to outside of an own computer; and a control unit that controls transfer of stored data in the memory to the outside of the own computer, the control unit selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area, within a period in which updating from the own computer to the memory is suspended, copying stored data in the small areas selected as the indirect transfer small areas from the memory to the save area with use of the copy unit, and in parallel to the copying, transferring stored data in the small areas selected as the direct transfer small areas from the memory to the outside of the own computer with use of the communication unit, and transferring the stored data in the small areas, having been copied to the save area, from the save area to the outside of the own computer with use of the communication unit, wherein in the selection, the copying of the stored data in the indirect transfer small areas to the save area, and the transfer of the stored data in the direct transfer small areas to the outside of the own computer, the control unit selects one of the small areas as the indirect transfer small area and one of the small areas as the direct transfer small area, from among the plurality of the small areas which are transfer targets in the memory, each time processing to copy stored data in the small area, selected as the indirect transfer small area, from the memory to the save area is completed, if there remains any of the small areas which are transfer targets not having been selected as the indirect transfer small area or the direct transfer small area, the control unit selects next one of the small areas as the indirect transfer small area, and each time processing to transfer stored data in the small area, selected as the direct transfer small area, from the memory to the outside of the own computer is completed, if there remains any of the small areas which are transfer targets not having been selected as the indirect transfer small area or the direct transfer small area, the control unit selects next one of the small areas as the direct transfer small area.

17. A non-transitory computer readable medium storing a program comprising instructions for causing a computer to function as, the computer including a memory including a plurality of small areas and a save area for temporarily saving data in the memory:

a copy unit that creates a copy of data;

a communication unit that transmits data to outside of an own computer; and a control unit that controls transfer of stored data in the memory to the outside of the own computer, the control unit selecting some of a plurality of the small areas which are transfer targets in the memory as indirect transfer small areas to be transferred to the outside of the own computer through the save area, and selecting the others of the plurality of the small areas as direct transfer small areas to be transferred to the outside of the own computer not through the save area, within a period in which updating from the own computer to the memory is suspended, copying stored data in the small areas selected as the indirect transfer small areas from the memory to the save area with use of the copy unit, and in parallel to the copying, transferring stored data in the small areas selected as the direct transfer small areas from the memory to the outside of the own computer with use of the communication unit, and transferring the stored data in the small areas, having been copied to the save area, from the save area to the outside of the own computer with use of the communication unit, wherein in the selection, the control unit divides the plurality of the small areas which are transfer targets in the memory into two, namely the indirect transfer small areas and the direct transfer small areas, and when dividing the small areas into two, the control unit divides the small areas in such a manner as to minimize a maximum value of a time required for copying stored data in all of the small areas selected as the indirect transfer small areas from the memory to the save area with use of the copy unit, and a time required for transferring stored data in all of the small areas selected as the direct transfer small areas from the memory to the outside of the own computer with use of the communication unit.

* * * * *